(12) United States Patent
Sanne

(10) Patent No.: US 6,295,536 B1
(45) Date of Patent: Sep. 25, 2001

(54) COMPUTER ARCHITECTURE FOR MULTI-ORGANIZATION DATA ACCESS

(75) Inventor: James C. Sanne, Fairfax, VA (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/219,769

(22) Filed: Dec. 23, 1998

(51) Int. Cl.[7] ....................................... G06F 17/30
(52) U.S. Cl. .............................. 707/10; 707/9; 707/203; 707/201
(58) Field of Search ...................... 705/9; 707/201, 707/9, 10, 203; 709/206; 706/45

(56) References Cited

U.S. PATENT DOCUMENTS

| | | | |
|---|---|---|---|
| 5,657,461 | * | 8/1997 | Harkins et al. ................ 395/333 |
| 5,706,452 | * | 1/1998 | Ivanov ............................ 345/331 |
| 5,790,790 | * | 8/1998 | Smith et al. ..................... 709/206 |
| 5,813,009 | * | 9/1998 | Johnson et al. ................. 707/100 |
| 5,862,325 | * | 1/1999 | Reed et al. ................. 395/200.31 |
| 5,991,733 | * | 11/1999 | Aleia et al. ...................... 705/8 |
| 6,064,977 | * | 5/2000 | Haverstock et al. ............. 705/9 |
| 6,092,083 | * | 7/2000 | Brodersen et al. ............. 707/201 |
| 6,134,530 | * | 10/2000 | Bunting et al. .................. 705/7 |
| 6,182,059 | * | 1/2001 | Angotti et al. .................. 706/45 |

OTHER PUBLICATIONS

Zimmerman, Daniel M., "A Preliminary Investigation into Dynamic Distributed Workflow", May 21, 1998, pp. 1–47.

* cited by examiner

*Primary Examiner*—Thomas Black
*Assistant Examiner*—Charles L. Rones

(57) ABSTRACT

Users are provided access to locally controlled data under centrally controlled rules of access. First, users request access to one or more agency databases from an enterprise system. After access is authorized using any known technique, users access agency databases, via the Internet, intranet(s) or other public or enterprise networks, using enterprise standard forms. Industry standard display programs, such as web browsers may be used to display the forms. The data fields on the forms are defined by agency and user profiles stored in enterprise databases. The content of the fields are supplied by the agency databases.

21 Claims, 11 Drawing Sheets

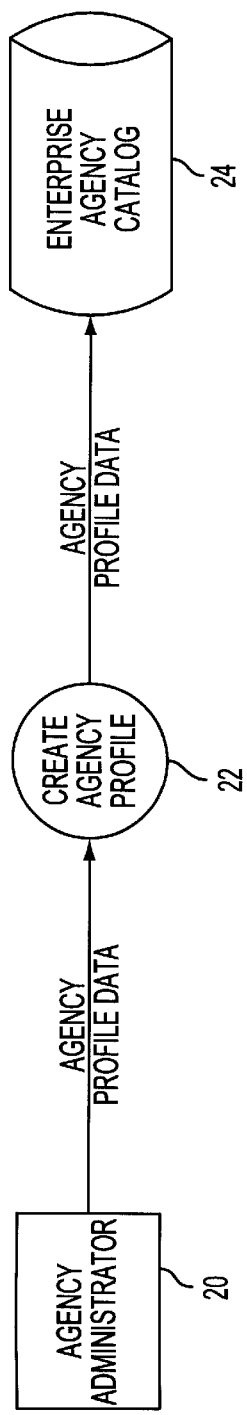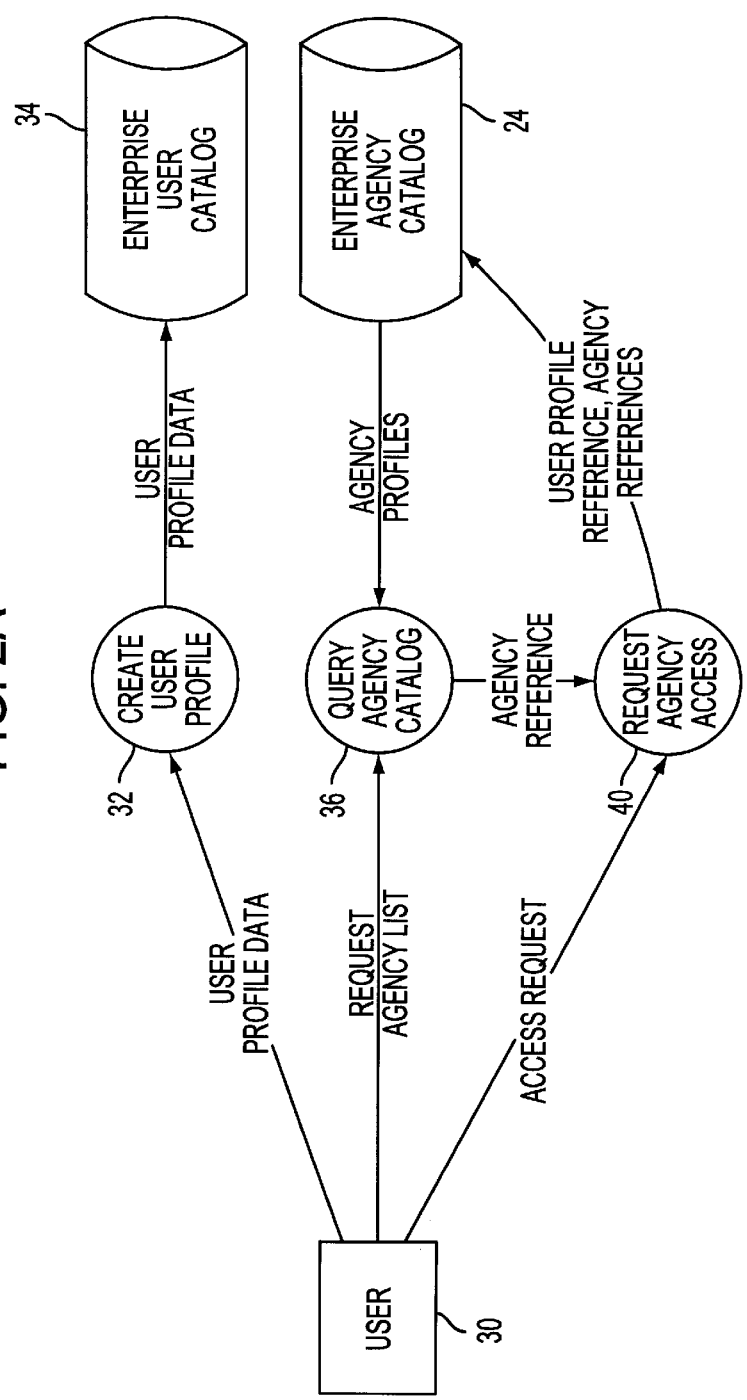

COMPUTER ARCHITECTURE FOR MULTI-ORGANIZATION DATA ACCESS

BACKGROUND OF THE INVENTION

1. Field of the Invention

The present invention is directed to a system for collaboration between widely distributed users and, more particularly, for the users to submit and receive data stored in a collection of independent databases of an enterprise using enterprise-standard forms and reports from user-selected data sources.

2. Description of the Related Art

Regardless of the type of work a worker wants to accomplish, obtaining access to data is often a critical task. At this point in time, there is much data available in computer-readable formats. However, typically computer system design has involved relatively small-scale projects designed to meet a specific need or two. In large organizations, even when the software is standardized, often the databases are local, for both communication efficiency and to reflect differences in local conditions.

One reason why variations exist in local databases can be explained with reference to procurement systems. Some products and services required by an organization are best obtained from nearby companies. Therefore, when an organization has personnel based hundreds or thousands of miles apart, it is beneficial for the procurement systems used in different localities to have only the data needed at that locality. For example, there is no need for a purchasing agent to have access to a list of all the coffee services used by a multinational corporation. There are also often differences in the functions performed at different locations and it is usually more efficient to limit data availability to what a user is expected to need.

There are many types of organizations which experience such problems. Any organization with personnel in locations separated by hundreds or thousands of kilometers might experience such situations, including businesses, governments and non-governmental organizations. Different terminology is used to describe the divisions and subdivisions of such organizations. In the description below, the term "enterprise" will be used to refer to the largest organizational level and the term "agency" will be used to refer to a smaller group within the enterprise. However, the problems and concepts are not limited to business enterprises or government agencies, but include any large organization, whether divided into subsidiaries, divisions, departments, or any other term describing an organizational sub-entity.

There are many occasions when changing circumstances require access to more information than what is stored locally. When the required information is available elsewhere in database(s) of an organization, it is desirable for workers to have an easy way to directly access the data via the same computer used to access data stored locally. However, using conventional technology, a large amount of work is required to design the communication and interface software. Even when the data is stored in compatible formats in two different locations, if the systems used to access the data were not designed to permit remote access, the user at one location will have difficulty accessing the data at another location. In typical multi-agency enterprises, users are limited to a single agency's database or are required to perform complex configuration tasks to connect to other agency databases. Previously, users would fill out enterprise standard forms in applications that were limited to a single agency's reference data. A manual change to application configuration files was required to utilize a separate agency's database.

This problem is exacerbated when more than mere data access is provided by the computer system. Existing systems require users to be connected to the same agency database to route a standard form to other users for collaboration. To receive information in report form from multiple agency sources also requires manual application configuration changes or a paper-based process.

SUMMARY OF THE INVENTION

It is an object of the present invention to provide on-line access to data in multiple existing databases regardless of location.

It is another object of the present invention to provide a system for routing documents to geographically or organizationally diverse users for collaboration and approval.

It is a further object of the present invention to support existing security requirements for access to data by geographically and organizationally diverse users.

It is yet another object of the present invention to provide a system permitting a user to route documents containing data obtained from local or remote databases to a database of a selected agency all under the system's control of access to the databases.

It is a yet further object of the present invention to provide a procurement system that permits a user to select from among geographically and organizationally diverse databases and route purchase requests to multiple agencies for approval and requisition.

The above objects can be attained by a computer program having an object framework including a document handling module maintaining records relating to forms and attachments; a document routing module routing forms to users for editing and approval; and an interface module interfacing with the plurality of databases. Preferably, the computer program also includes creating agency profiles stored in enterprise databases; and registering users in response to completion of at least one form by the users by storing a user profile in the enterprise databases. When a user selects an agency from the agency profiles in the enterprise databases, the user can request and receive data from that agency's independent database. Forms can be completed by the user with agency-specific information in that agency's independent database combined with information from the enterprise databases. The principles of the invention may be used in applications such as purchasing or procurement; retrieval of archived or imaged data, such as court documents; and many other applications.

These together with other objects and advantages which will be subsequently apparent, reside in the details of construction and operation as more fully hereinafter described and claimed, reference being had to the accompanying drawings forming a thereof, wherein like numerals refer to like parts throughout.

BRIEF DESCRIPTION OF THE DRAWINGS

FIG. 2A is a flowchart for creation of an agency profile.

FIG. 2B is a flowchart for creation of a user profile and requesting access to agency databases.

FIG. 2I is a flowchart for editing and approving forms routed through personal queues.

DESCRIPTION OF THE PREFERRED EMBODIMENTS

Figure 1:
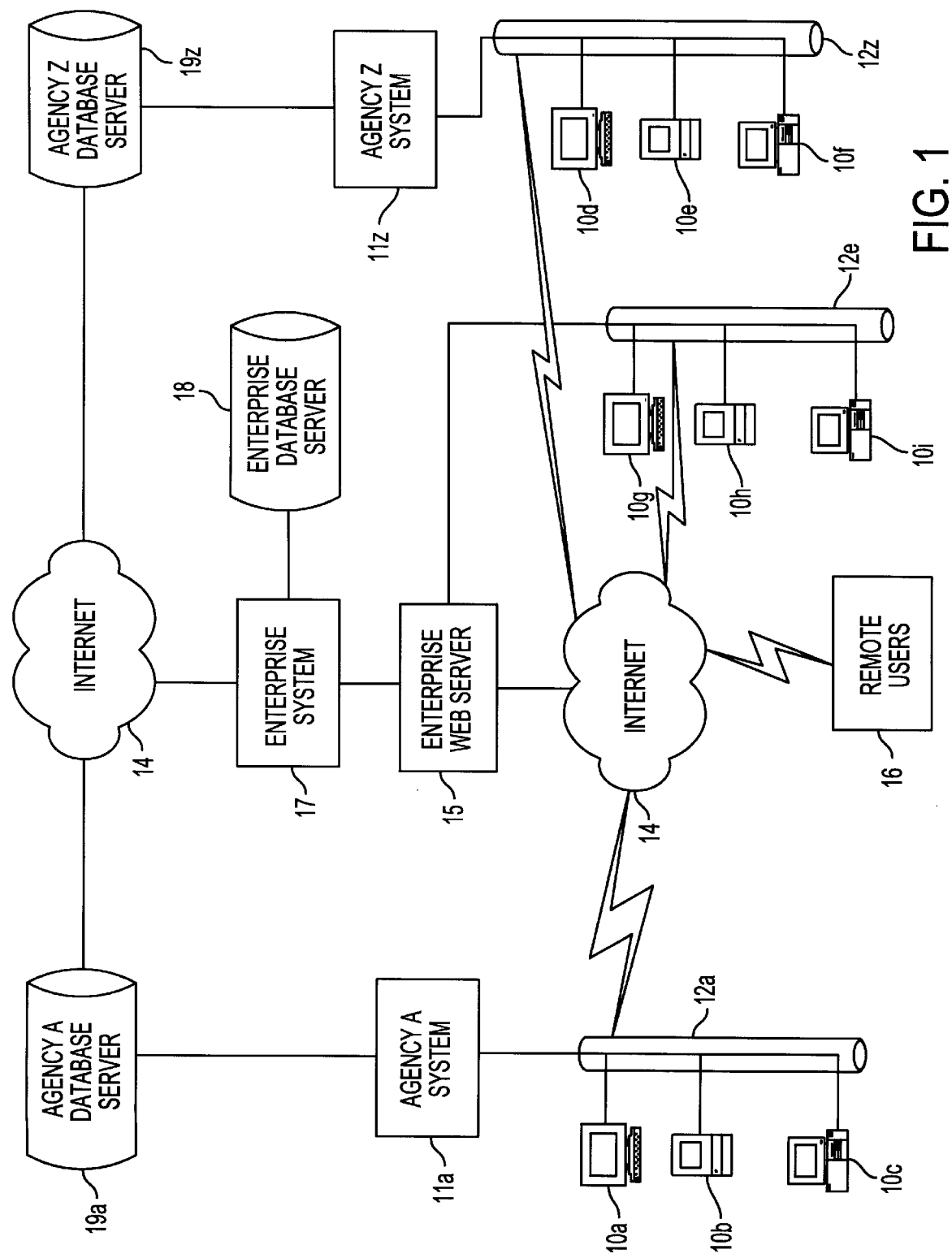
FIG. 1 is a block diagram of a system according to the present invention.

Illustrated in FIG. 1 is a block diagram of a system according to the present invention. Local users use personal computers or workstations 10a–10c, etc. connected to agency A system 11 via a local or wide area network (LAN/WAN) 12. In FIG. 1, two of the agency systems 11 and LAN/WANs 12 are illustrated, system 11a and LAN/WAN 12a for agency A and system 11z and LAN/WAN 12z for agency Z. The local users at agency A can be connected in a conventional manner via LAN/WAN 12a and the Internet 14 to enterprise Web server 15. The term "Internet" is used here to refer not only to the combination of public computer networks commonly identified using that term, but also may be an intranet completely under control of the organization operating enterprise system 17, or other public or private network(s). Similarly, the terms using the word "Web" refer to components preferably using or supporting an industry standard graphical user interface for communication of information, such as Netscape Navigator® or Microsoft® Internet Explorer, but is not limited to display of World Wide Web pages and could include a proprietary user interface. Remote users 16 also can be connected via the Internet 14 to enterprise Web server 15. Enterprise system 17 provides control and indices for access to and routing of data stored by the system and may be part of the same computer system as either or both of enterprise Web server 15 and enterprise database server 18. Users of the system illustrated in FIG. 1 are initially connected by enterprise Web server 15 to enterprise system 17 and database server 18. Of course the local users 10a–10c who work at an agency can also access the agency database server 19 (respectively databases 19a and 19z for agencies A and Z) in a conventional manner.

Use of the system illustrated in FIG. 1 will be described with reference to FIGS. 2A–2J which use generic agency reference numerals: agency system 11, LAN/WAN 12, and database(s) 19. However, in the description below reference will be made to agencies A and Z and the corresponding specific components are referenced, e.g., database(s) 19a of agency A.

As illustrated in FIG. 2A, an agency system administrator 20 at, e.g., agency A, logs into enterprise Web server 15 via a Web browser based application executing on one of the local PCs 10a–10c. The PC used by the administrator may be connected to enterprise Web server 15 via any conventional network, including local area network (LAN) 12e, a wide area network (WAN), a virtual private network (VPN), value added network (VAN), or the Internet 14. The administrator creates 22 a profile in enterprise agency catalog 24 which is included in databases on enterprise database server 18. The profile stores key configuration information about data stored by agency database server 19, including: database server IP address, database server port number, database name, database user name, database password. The profile also stores functional information about agency A, including ailing address, and points of contact. An example of an agency catalog profile is provided below.

| Agency Catalog Profile | |
|---|---|
| Field | Sample Data |
| Database IP Address | 162.70.148.256 |
| Database Server Port Number | 5000 |
| Database Name | AQL_AGENCY001_DB |
| Database User Name | AQL_USER |
| Database Password | 00qw992nh7 (encrypted) |
| Administrator POC | John Doe |
| Administrator Phone | (202) 555-1212 |
| Administrator Email | John_Doe@agency001.enterprise.org |
| Address | 1323 N. 14$^{th}$ St. Washington, DC |

Once an agency's profile has been created as illustrated in FIG. 2A, users may obtain access to the agency's databases under control of the enterprise system 17 in the manner illustrated in FIG. 2B. First, user registration is performed. A user 30 accesses enterprise Web server 15 via a Web browser based application over the Internet 14. The user 30 creates 32 a profile in enterprise user catalog 34 maintained on enterprise database server 18. The user profile stores functional information including name, title, supervisor, user name, password, phone numbers, email address, and mailing address. An example of the user profile is provided below.

| User Catalog Profile | |
|---|---|
| Field | Sample Data |
| Last Name | Francis |
| First Name | Jane |
| Title | Financial Analyst |
| Organization | Enterprise Finance & Accounting |
| Supervisor | Bert Rouen |
| User Name | jfrancis |
| Password | ui28u3njj (encrypted) |
| Phone | (202) 555-1313 |
| Email | Jane_Francis@finance.enterprise.org |
| Address | 12893 Enterprise Way, Rice, TX |

After completing a user profile, users may register access requests to one or more agency databases. User s first query 36 enterprise age agency catalog 24 via a Web browser based application to select agencies the users would like to access. Based on the user's choices, the system sends user access requests to the selecter agency administrators 20. The access request is a form having a format generated by the enterprise system 17. The form is completed by the user and stored in enterprise agency catalog 24. The request contains two basic elements: a reference to the requestor's user profile stored in enterprise user catalog 34 (FIG. 2B) and request(s) for specific system privileges, such as approval authority, form access, etc. The request is sent via an automated notification process 42 (FIG. 2C) to the agency administrator responsible for the agency database(s) requested by the user.

Figure 2C:
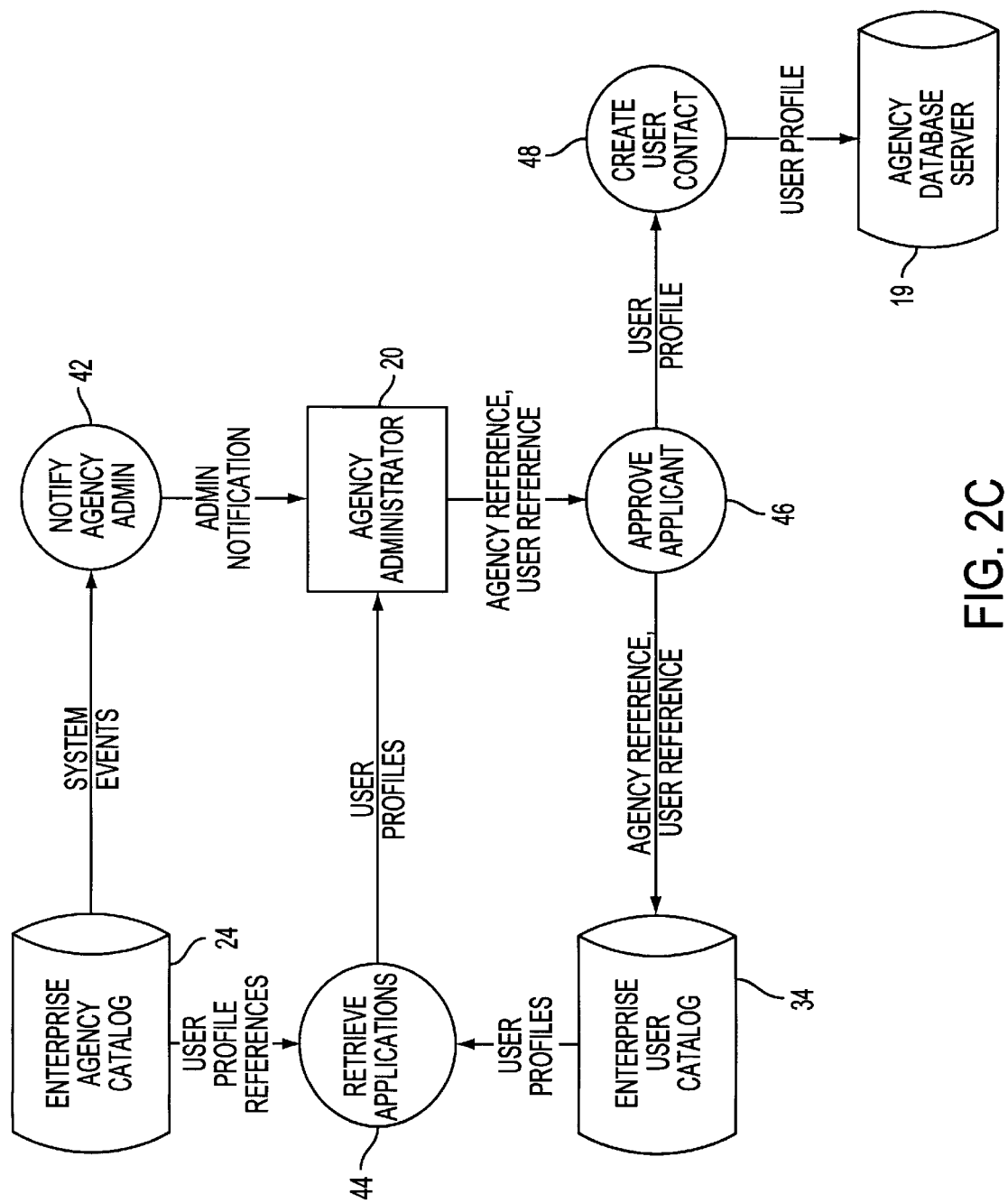
FIG. 2C is a flowchart for approving requests for access to agency databases.

An example of access request processing is illustrated in FIG. 2C. If user 30 has requested access to the agency Z database(s), administrator 20 for agency Z is notified 42 that a user has requested access to the agency Z database. The agency administrator 20 for agency Z retrieves 44 from enterprise agency catalog 24 user requests for access to agency Z database(s) via enterprise Web server 15 and a Web-browser based application. The administrator 20 verifies user identity through means external to the system, e.g., by interviewing the requestor in a phone conversation, looking up the requestor in an enterprise human resources directory, or forwarding the request to another individual or agency for verification. If the administrator 20 approves 46 the application and grants access to user 30, a reference to the agency profile is created 48 in the user's profile in enterprise user catalog 34. The reference may be a reference or other link between the user and agency profiles. The user's contact information is also added to the agency Z database server 19z for reference purposes.

Figure 2D:
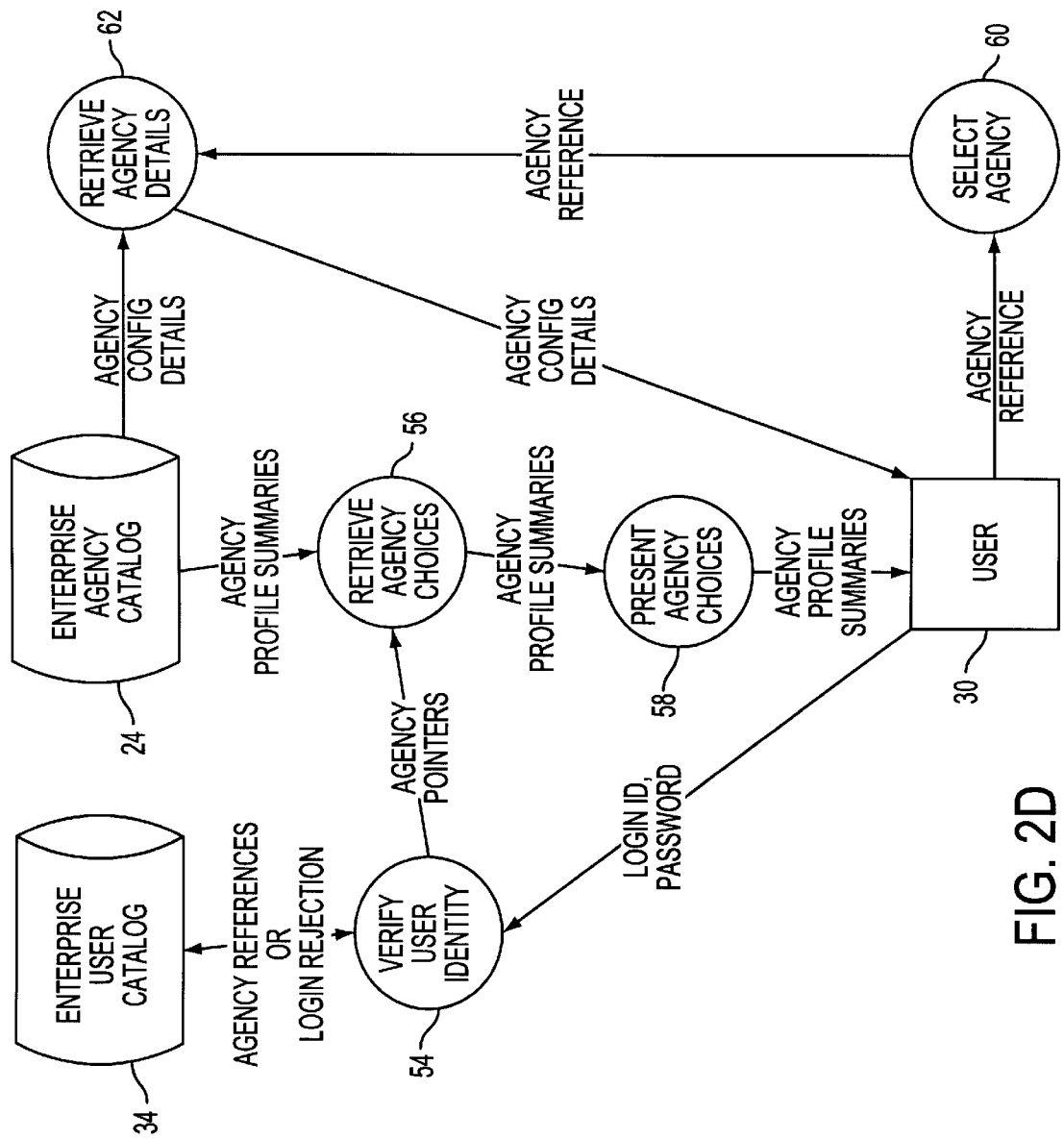
FIG. 2D is a flowchart for user login to a system according to the present invention to obtain access to agency databases previously requested.

As illustrated in FIG. 2D, when user 30 subsequently logs into the enterprise system 17 and the user's identity is verified 54 with reference to enterprise user catalog 34, user 30 receives 56, 58 from enterprise agency catalog 24 a list of databases on agency server 19 to which access has been granted. User 30 then selects 60 the agency to which he/she would like to connect. The agency configuration details are retrieved 62 from enterprise agency catalog 24 and delivered to the user's Web browser based application. Until the user specifies a different site, this site's configuration information is cached. Sample configuration details are presented in the table below.

Agency Configuration Details

| Field | Sample Data |
| --- | --- |
| Database IP Address | 162.70.148.256 |
| Database Server Port Number | 5000 |
| Database Name | AQL_AGENCY001_DB |
| Database User Name | AQL_USER |
| Database Password | 00qw992nh7 (encrypted) |

Figure 2E:
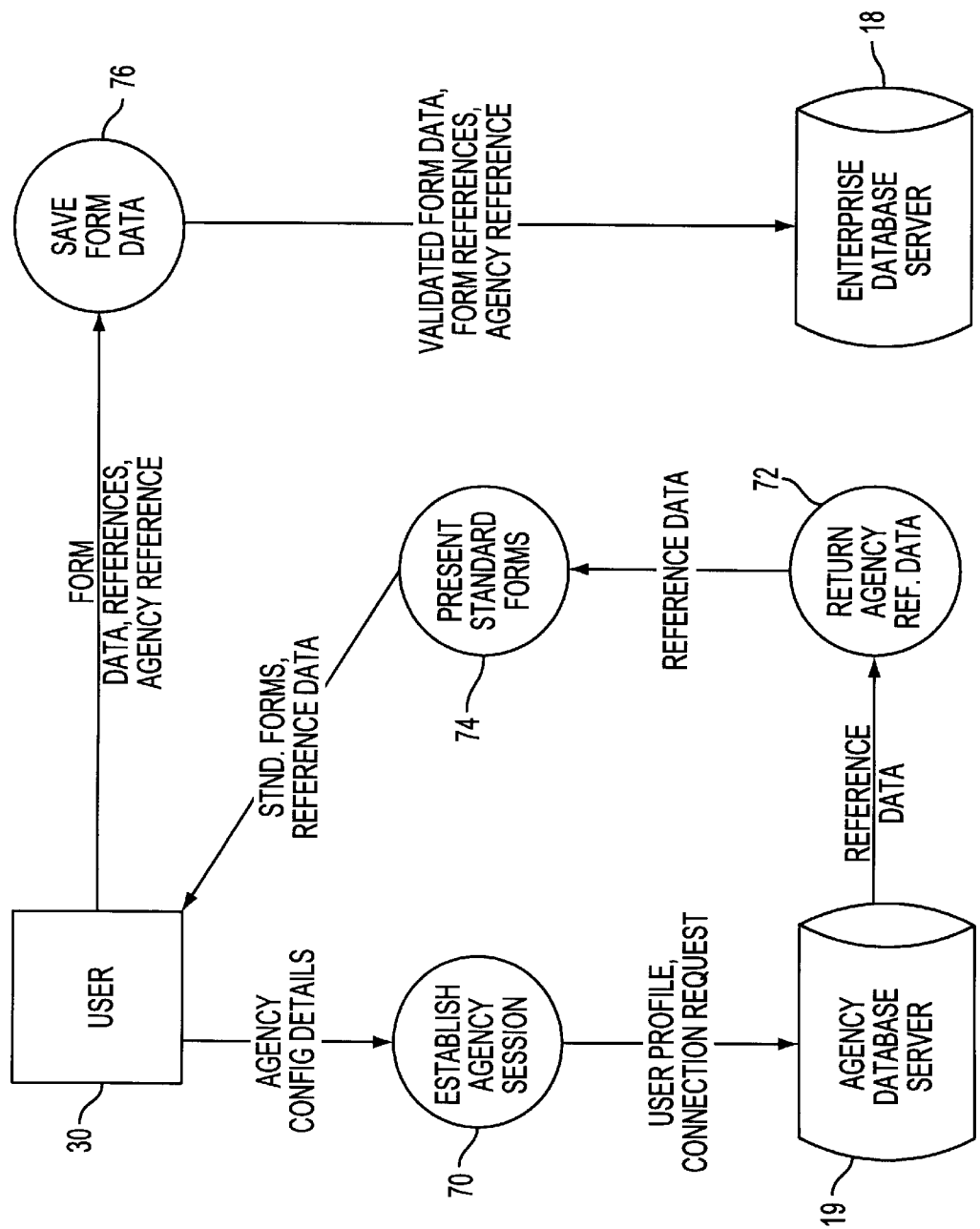
FIG. 2E is a flowchart for accessing data in agency databases.

As illustrated in FIG. 2E, after the selected agency's detailed database configuration data has been retrieved 62 from the enterprise agency catalog 24, a connection is established 70 between the user's Web browser based application and the agency database using the configuration data. The user can now access reference data 72 in the agency database(s) on server 19 with standard queries controlled by the Web browser based application executing on the user's PC or workstation 10. Users fill out enterprise standard forms 74 with agency-specific data and save 76 the forms to the enterprise database server 18.

The enterprise standard forms contain data fields that represent business objects common to all agencies. The system may be used for many business purposes. One example is purchasing. The following table is an example of the data fields that may appear on an enterprise standard purchase request.

Sample Enterprise Standard Form

| Field | Description |
| --- | --- |
| Requestor | Employee requesting the purchase |
| Request Date | Date the goods/service was requested |
| Description | Description of goods/service |
| Date Required | Date the requestor needs the goods/service |
| Estimated Unit Cost | Dollar amount per unit of goods/service |
| Quantity | Number of goods/services required |
| Vendor | Suggested vendor from which to purchase goods/service |
| Contract Number | Contract to use for the purchase |
| Funding Source | Account number used to purchase goods/service |
| Shipping Address | Address where the goods are sent |

These fields can be populated with data that are agency specific, user generated, or system generated. The table below is an example of how each of the sample form fields above could be populated.

Field Values and Sources

| Field | Sample Value | Sample Source |
| --- | --- | --- |
| Form Reference | 2430 | System |
| Form Number | 981116-001-JF | System |
| Requestor | Jane Francis | System |
| Request Date | 10/11/1998 | System |
| Description | Computer | User |
| Date Required | 11/1/1998 | User |
| Estimated Unit Cost | $3,000.00 | User |
| Quantity | 1 | User |
| Vendor | Bob's Computer Store | Agency reference data |
| Contract Number | COMP-BOB-010198 | Agency reference data |
| Funding Source | 39874682-99822 | Agency reference data |
| Shipping Address | 1231 North St., Ball, GA | Agency reference data |
| Agency Reference | 46 | System |

Figure 2F:
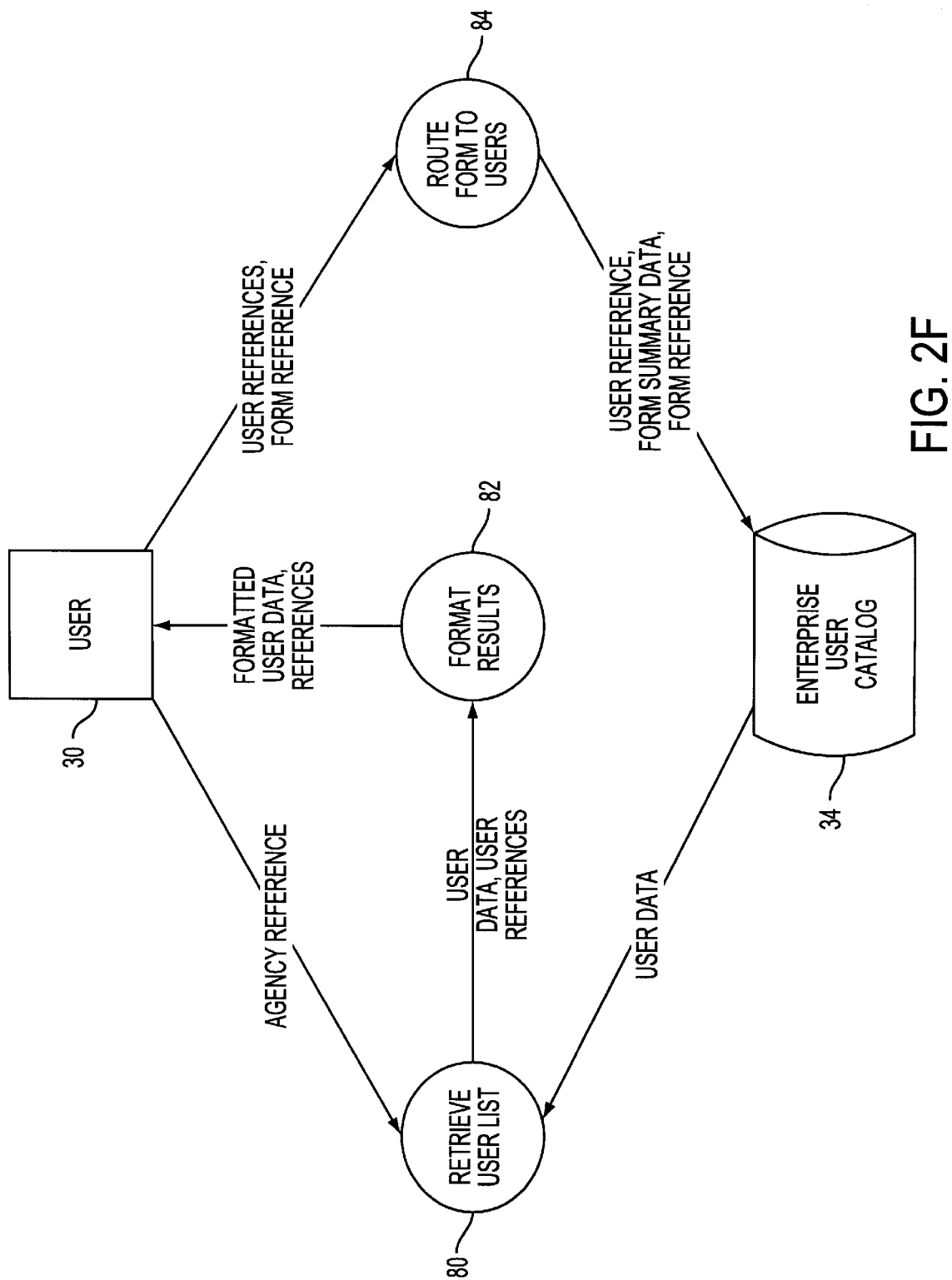
FIG. 2F is a flowchart for routing forms to users of a system according to the present invention.

As illustrated in FIG. 2F, users can route 84 the saved forms to other users for collaborative purposes. Users can only route forms to users who have access to the agency in which the form wag created. Routing from one user to another occurs when the application saves associations between users and forms to personal user queues in the enterprise user catalog 34.

Each user registered in an agency user catalog has at least one personal queue (illustrated in FIG. 3) stored on enterprise database server 18. The personal queue is a set of database tables that store references to the entities as indicated below.

Personal Queue

| Entity | Sample Value |
| --- | --- |
| Queue Owner | ywhite |
| Queue Type | Inbox |
| Form Number | 981116-001-JF |
| Form Creator | jfrancis |
| Date Required | 11/01/98 |
| Form Description | Computer |
| Form Type | PR |
| Form Reference | 2430 |
| Agency Reference | 46 |

Figure 2G:
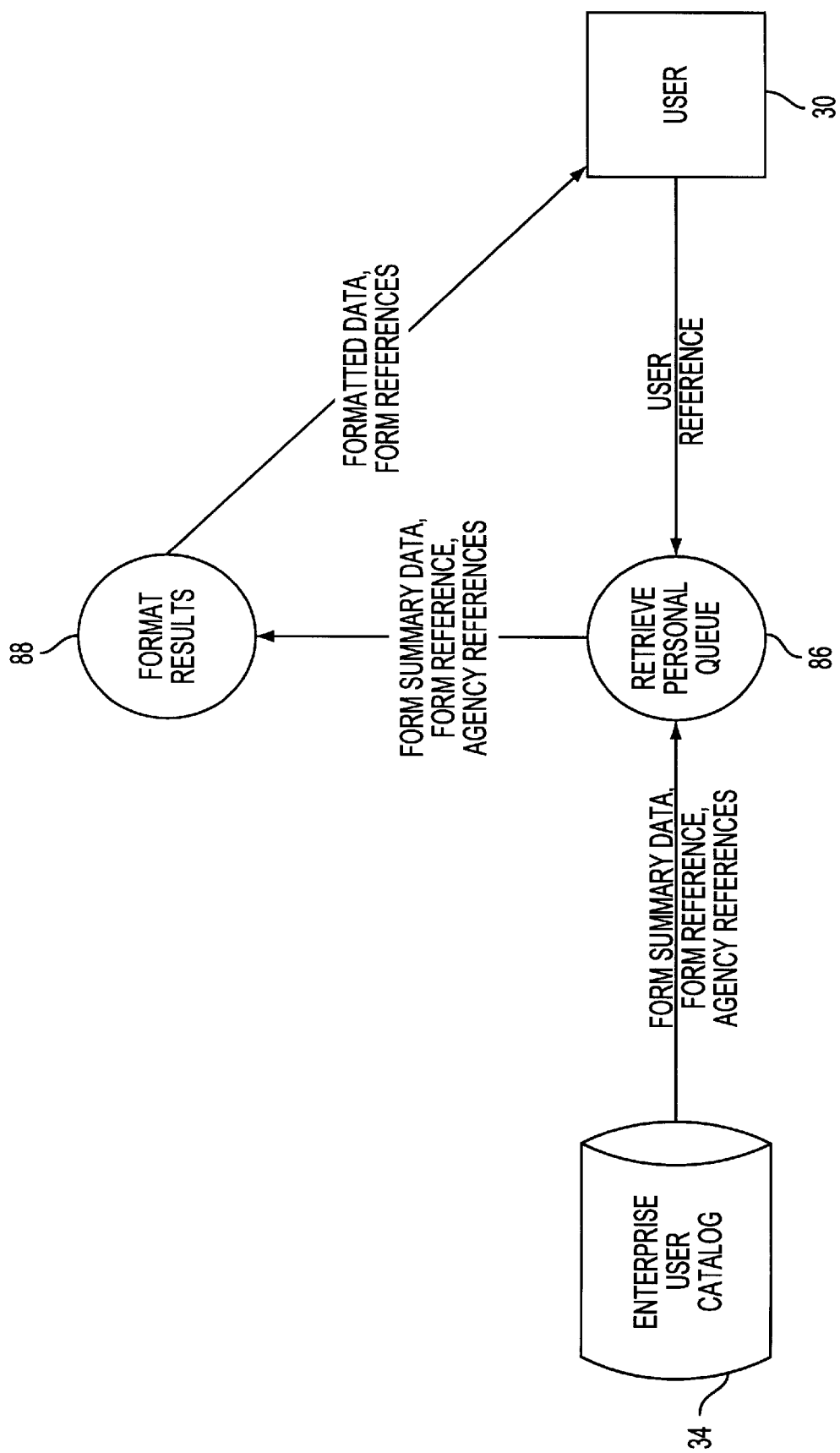
FIG. 2G is a flowchart for retrieving personal queues for collaborative access to forms.

Part of the user log-in process involves retrieving the user's personal queue as illustrated in FIG. 2G. This queue contains a summary list of business objects routed from other users for approval or review. When a user logs into the enterprise system 17 through Web server 15, the user's personal queue is retrieved 86 and formatted 88 for presentation to the user 30. An example of the information in the list retrieved from the agency database is provided below.

| Queue Summary Fields | |
|---|---|
| Field | Sample Value |
| Form Type | PR |
| Form Number | JF-101198-0001 |
| Requestor | J. Francis |
| Request Date | 10/11/1998 |
| Description | Computer |

Figure 2H:
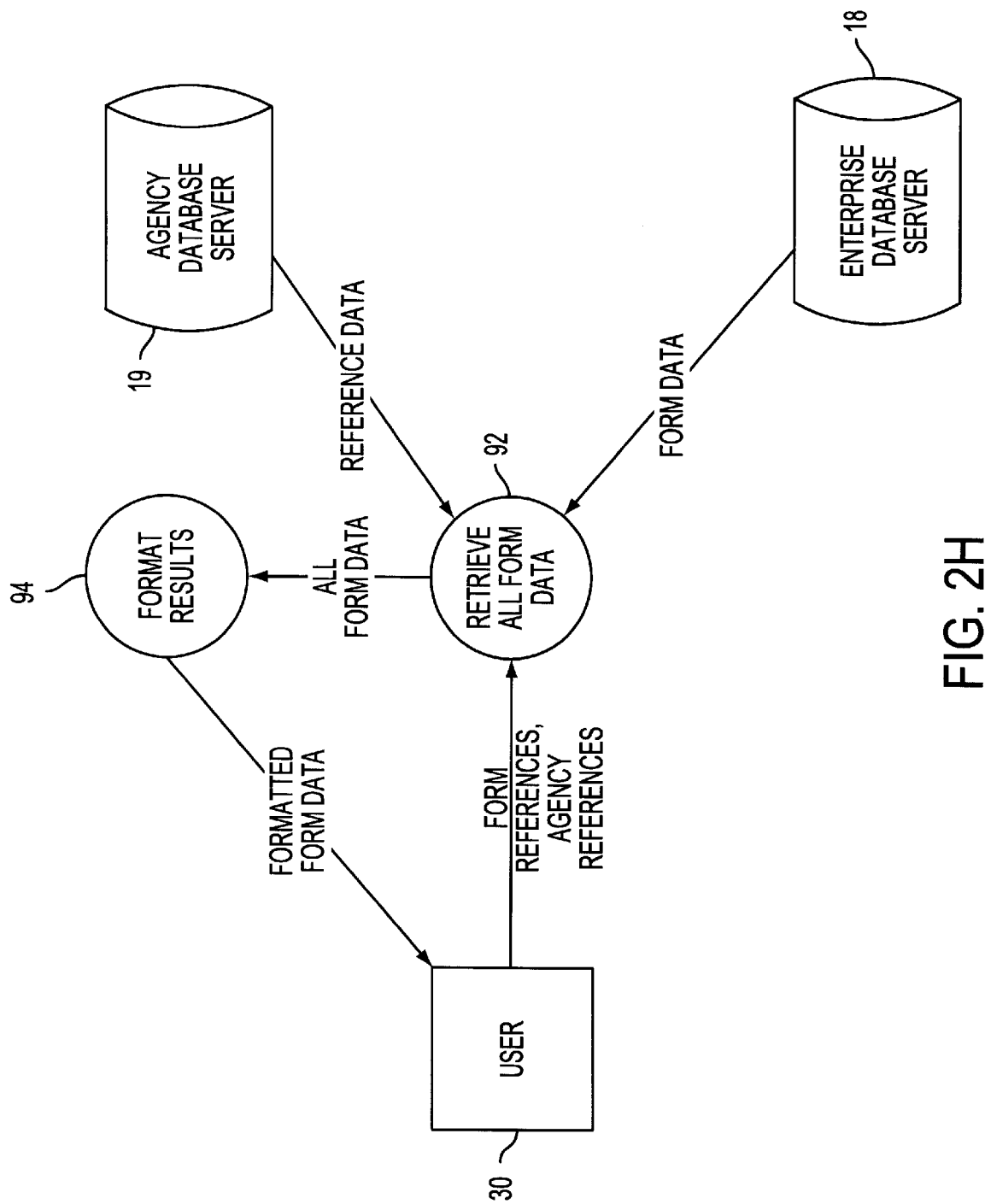
FIG. 2H is a flowchart for retrieving a form listed in a personal queue.

When user 30 selects an entry in the personal queue to retrieve the form that it represents, the agency reference in the personal queue is used to determine which agency was used to create the form. As illustrated in FIG. 2H, the agency reference is used to retrieve 92 relevant reference data from the agency database server 19. The form reference is used to retrieve form data from the enterprise database server 18. Other data related to the form, such as reviewer comments on the form, will also be retrieved 92 from the enterprise database server 18. The form data is used to format 94 the reference (and any other) data retrieved. To retrieve all form elements 92, the system must access data on the enterprise database server 18 and one of the databases on agency database server 19. Examples of the data stored in each database that is used to format 94 the reference data is provided below.

| Field | Sample Value |
|---|---|
| Form Elements in Enterprise Databases | |
| Form Reference | 2430 |
| Agency Reference | 46 |
| Form Number | 981116-001-JF |
| Requestor | J. Francis |
| Request Date | 10/11/1998 |
| Description | Computer |
| Date Required | 11/1/98 |
| Estimated Unit Cost | $3000 |
| Quantity | 1 |
| Vendor Reference | 46-39580 |
| Contract Reference | 46-979876 |
| Funding Source Reference | 46-817510 |
| Shipping Address Reference | 46-13789 |
| Form Elements in Agency Database | |
| Vendor Reference | 46-39580 |
| Vendor Name | Bob's Computer Store |
| Contract Reference | 46-979876 |
| Contract Number | COMP-BOB-010198 |
| Funding Source Reference | 46-817510 |
| Funding Source Code | 39874682-99820 |
| Shipping Address Reference | 46-13789 |
| Shipping Address | 1231 North St., Ball, GA |

When the user selects an entry (form) from the queue summary, the system connects to the enterprise database server 18. The system uses the agency reference from the queue entry to collect agency configuration details (see table above). The system then uses the form reference from the entry in the user's personal queue to retrieve form elements stored on the enterprise database server 18. Some form elements stored on the enterprise database server 18 are references (vendor reference, contract reference, funding source reference, ship address reference, etc.) to data stored on the agency database server 19. To convert the references or unique identifiers into user readable data, the system utilizes the agency configuration details to connect to the agency database server 19. The system retrieves the user-readable values from the agency database server 19 using the references. Finally, the form data from the enterprise and agency database servers 18, 19 is combined, formatted 94 and returned to the user. The reason that references, instead of names, are stored on the enterprise database server 18 for vendor, etc. is that data about the vendor may change. For instance, if "Bob's Computers" changed its name to "Bob's and Joe's Computers", the reference to vendor on the purchase request would still point to the appropriate vendor entry in the agency database server 19.

Figure 21:
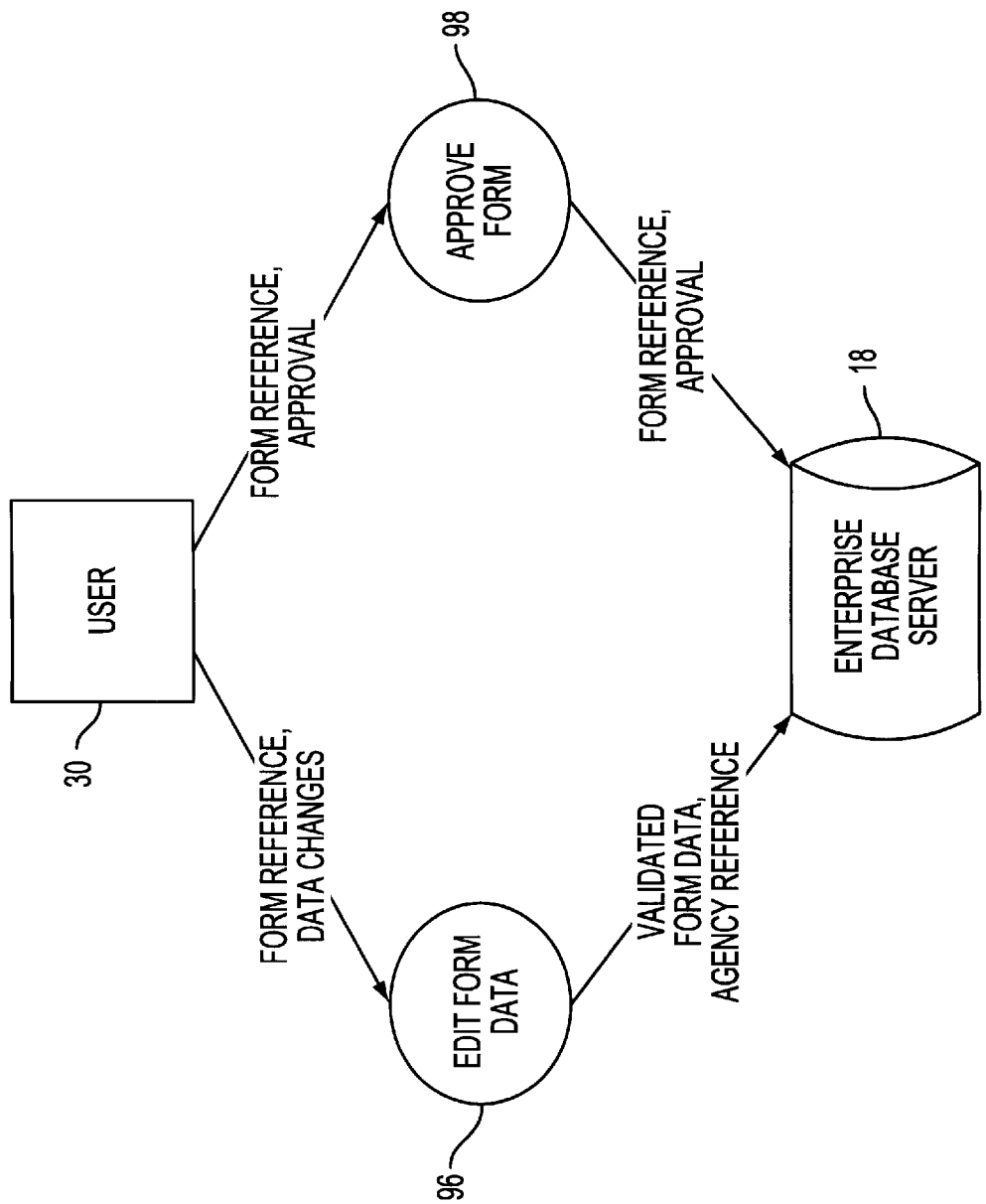

As illustrated in FIG. 21 the user may edit 96 the form after it is retrieved. Other users may be responsible for approval of the form's content. The form may be approved 98 by reference to other data available in the system, or by external means, such as telephone interview(s), paper processing, research results, etc.

Figure 2J:
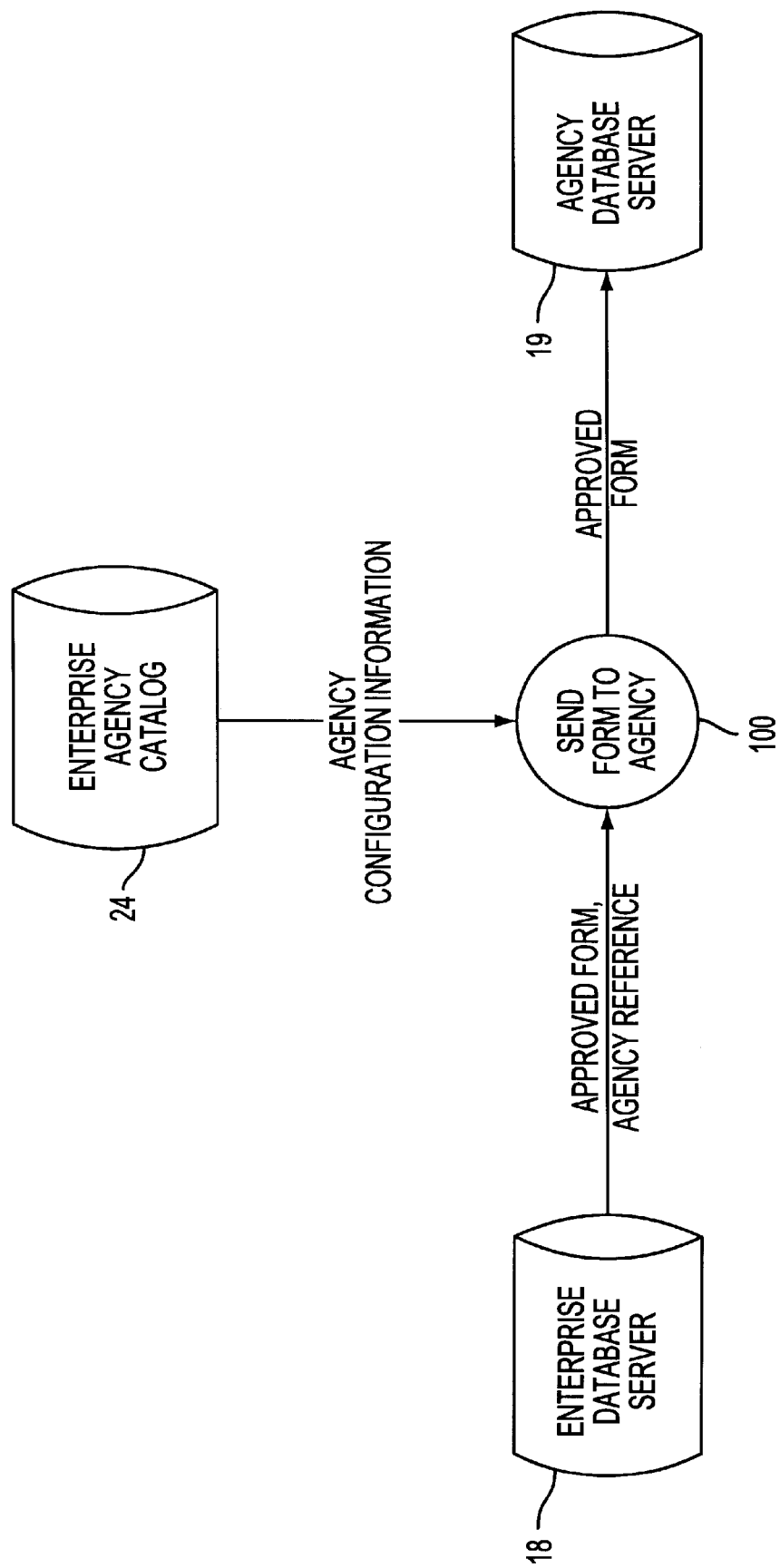
FIG. 2J is a flowchart for sending approved forms to an agency database.

As illustrated in FIG. 2J, once the form has been approved by all of the users that it was routed to, the form is automatically transmitted 100 by sending the data of the approved form to the agency database server 19 from which it was created, e.g., agency database server 19z, based on an agency reference stored with the form data. At this point, the agency Z system 11z can access the form for further processing.

Document routing can be controlled at two levels in the system. Administrative users can create user groups and templates to control document flow between individual users or between sub-groups of users. Document creators and approvers can use templates and groups to determine a document's path to full approval. Templates are particularly useful to manage the sequential review and approval of documents. Examples of template records are provided below.

| Template Record 1 | |
|---|---|
| Field | Sample Value |
| User | ywhite |
| Form Unique ID | 2430 |
| User Sequence | 1 |
| User Group | Finance |
| Approved Flag | True |

| Template Record 2 | |
|---|---|
| Field | Sample Value |
| User | jbrazel |
| Form Unique ID | 2430 |
| User Sequence | 2 |
| User Group | Network Support |
| Approved Flag | False |

Figure 3:
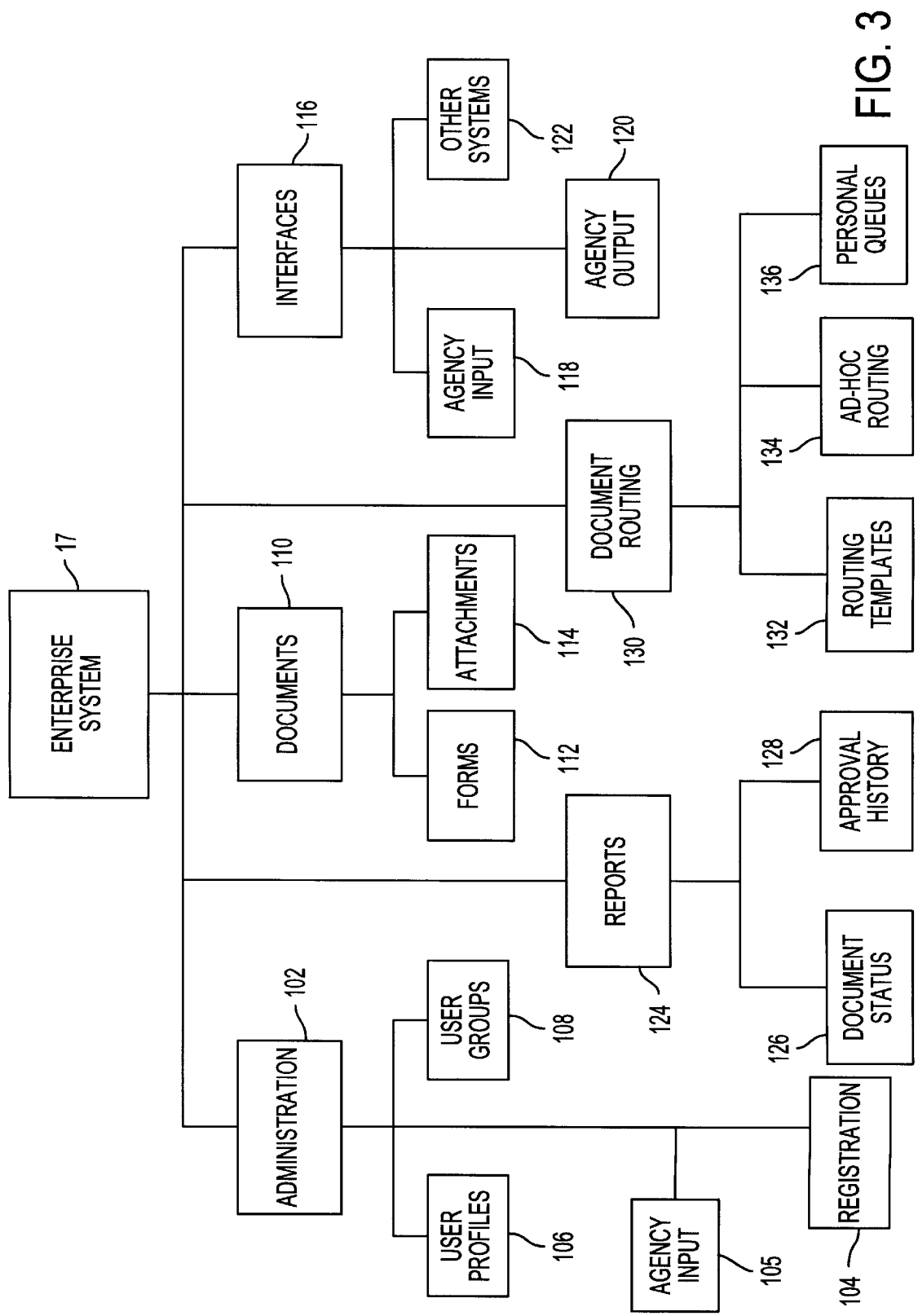
FIG. 3 is a block diagram of software modules executing on an enterprise system according to the present invention.

A high level view of an object framework stored on the enterprise system 17 to support the dynamic changes in connections to agency databases is illustrated in FIG. 3. An administration module 102 includes submodules for registration 104 of new users as described above with reference to FIGS. 2B and 2C; receipt of agency input 105, such as agency profile data as illustrated in FIG. 2A; administration of user profiles 106 as described above with reference to FIG. 2C and 2D; and forming user groups 108 when a request to access an agency database is approved as described above with reference to FIG. 2C. A document handling module 110 includes submodules for maintaining records relating to forms 112 and attachments 114 which are executed when users access agency databases as described above with reference to FIGS. 2E and 2I. An interface module 116 includes an agency input submodule 118 which supports creation of an agency profile as illustrated in FIG. 2A. An output interface submodule 120 is used in sending approved forms to agency database servers 19, as described above with reference to FIG. 2J. Interfaces 122 to other systems may also be provided. A reports module 124 includes document status 126 and approval history 128 submodules which support user access to agency databases 19 as described above with reference to FIG. 2E. A document routing module 130 includes submodules for routing based on templates 132 and ad-hoc routing 134, such as in the routing described above with reference to FIG. 2F. Personal queues 136 are also included in document routing module 13 to perform the functions described above with reference to FIGS. 2G and 2H. Although the terms modules and submodules are used in this paragraph, as noted above, object oriented programming is preferably used to perform the functions of these modules for efficiency in developing and maintaining software program code.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Reference Number List

10 personal computers or workstations
11 agency system
12 local or wide area network (LAN/WAN)
14 public computer network, such as the Internet
15 enterprise Web server
16 remote users
17 enterprise system
18 enterprise database server
19 agency database server
20 agency administrator
22 create agency profile
24 enterprise agency catalog
30 user
32 create user profile
34 enterprise user catalog
36 query agency catalog
40 request agency access
42 notify agency administrator
44 retrieve applications
46 approve applicant
48 create user contact
54 verify user identity
56 retrieve agency choices
59 present agency choices
60 select agency
62 retrieve agency details
70 establish agency session
72 return agency reference data
74 present standard forms
76 save form data
80 retrieve user list
82 format results
84 route form to users
86 retrieve personal queue
88 format results
92 retrieve all form data
94 format results
96 edit form data
98 approve form
100 send form to agency
102 administration module
104 registration submodule
105 agency input administration submodule
106 user profiles submodule
108 user groups submodule
110 documents module
112 forms submodule
114 attachments submodule
116 interfaces module
118 agency input interface submodule
120 agency output submodule
122 other systems submodule
124 reports module
126 document status submodule
128 approval history submodule
130 document routing module
132 routing templates submodule
134 ad-hoc routing submodule
136 personal queues submodule

What is claimed is:

1. A method comprising:

storing records relating to forms and attachments in a plurality of databases;

manipulating the records relating to the forms and the attachments;

routing the forms to users for editing and approval;

creating agency profiles stored in enterprise databases; and registering the users in response to completion of at least one form by the users by storing a user profile in the enterprise databases and user profile data in at least one agency database.

2. A method as recited in claim 1, wherein said routing comprises:

routing a request for access to an agency database to an agency administrator responsible for the agency database;

modifying the user profile in the enterprise databases upon receipt of approval of access;

storing at least a reference to the user profile in the agency database.

3. A method as recited in claim 2, wherein the enterprise databases contain personal queues of the users, each personal queue identified by a user reference identifying a receiving user selected to receive at least one document, and wherein said routing further comprises:

supplying user data and at least one user reference to a sending user when routing of a document is requested; and routing form summary data and a form reference to the personal queue of at least one user identified by the at least one user reference.

4. A method as recited in claim 3, wherein said routing further comprises:
routing to the enterprise databases a routing template identifying specified users to receive a specified document type and an order in which the specified users receive a document; and
automatically routing the form summary data and the form reference to the personal queues of the specified users based on the routing template when a completed form of the specified document type is stored by a submitting user.

5. A method as recited in claim 4, wherein said manipulating comprises
retrieving the form summary data, the form reference, and an agency reference from the enterprise databases to obtain entries in the personal queue of one of the specified users,
formatting at least the form summary data for display to the one of the specified users as the personal queue of the one of the specified users,
retrieving reference data corresponding to the form reference from the agency database identified by the agency reference and the form data from the enterprise database upon selection of one of the entries in the personal queue of the one of the specified users, and
formatting the form data and the reference data for display to the one of the specified users.

6. A method as recited in claim 5,
wherein the specified document type is a purchase request,
wherein said routing automatically routes purchase requests to the specified users for approval, based on the routing template, and
wherein said manipulating formats the form data and the reference data to display information relating to at least one of cost, funding, vendor and requestor to the specified users.

7. A method, comprising:
storing records relating to forms and attachments in a plurality of databases;
manipulating the records relating to the forms and the attachments; and
routing the forms to users for editing and approval, and
wherein interfacing establishes communication between a user and an agency database when access is permitted by authorization data stored in enterprise databases,
wherein said manipulating supplies reference data in standard forms to the user after establishment of communication with the agency database, and
wherein said routing sends to the enterprise databases, form data, a form reference and an agency reference upon completion of one of the standard forms by the user.

8. A method as recited in claim 7,
wherein the agency database is one of a plurality of agency databases and the form data stored in the enterprise databases are used to format the reference data from any of the plurality of agency databases, and
wherein said manipulating further includes formatting the reference data, obtained from the agency database based on the form reference and the agency reference, and the form data obtained from the enterprise databases based on the form reference.

9. A method as recited in claim 7,
wherein the form data define a purchase request form, and
wherein said manipulating formats the form data and the reference data to display information relating to at least one of cost, funding, vendor and requestor to the user in an enterprise standard format.

10. A computer program embodied on a computer readable medium, comprising:
an interface module interfacing with a plurality of databases storing records relating to forms and attachments;
a document handling module manipulating the records relating to the forms and the attachments;
a document routing module routing the forms to users for editing and approval; and
an administration module including:
creating agency profiles stored in enterprise databases; and
registering the users in response to completion of at least one form by the users by storing a user profile in the enterprise databases and user profile data in at least one agency database.

11. A computer program as recited in claim 10, wherein said document routing module includes
routing a request for access to an agency database to an agency administrator responsible for the agency database;
modifying the user profile in the enterprise databases upon receipt of approval of access;
storing at least a reference to the user profile in the agency database.

12. A computer program as recited in claim 11,
wherein the enterprise databases contain personal queues of the users, each personal queue identified by a user reference identifying a receiving user selected to receive at least one document, and
wherein said document routing module further comprises:
supplying user data and at least one user reference to a sending user when routing of a document is requested; and
routing form summary data and a form reference to said interface module for storage in the personal queue of at least one user identified by the at least one user reference.

13. A computer program as recited in claim 12, wherein said document routing module further comprises:
routing to said interface module for storage in the enterprise databases, a routing template identifying specified users to receive a specified document type and an order in which the specified users receive a document; and
automatically routing the form summary data and the form reference to the personal queues of the specified users based on the routing template when a completed form of the specified document type is stored by a submitting user.

14. A computer program as recited in claim 13, wherein said document handling module comprises
retrieving the form summary data, the form reference, and an agency reference from the enterprise databases to obtain entries in the personal queue of one of the specified users,
formatting at least the form summary data for display to the one of the specified users as the personal queue of the one of the specified users,
retrieving reference data corresponding to the form reference from the agency database identified by the agency reference and the form data from the enterprise database upon selection of one of the entries in the personal queue of the one of the specified users, and formatting the form data and the reference data for display to the one of the specified users.

15. A computer program as recited in claim 14, wherein the specified document type is a purchase request, wherein said routing module automatically routes purchase requests to the specified users for approval, based on the routing template, and wherein said document handling module formats the form data and the reference data to display information relating to at least one of cost, funding, vendor and requestor to the specified users.

16. A computer program embodied on a computer readable medium, comprising:

an interface module interfacing with a plurality of databases storing records relating to forms and attachments;

a document handling module manipulating the records relating to the forms and the attachments; and a document routing module routing the forms to users for editing and approval, and wherein said interface module establishes communication between a user and an agency database when access is permitted by authorization data stored in enterprise databases, wherein said document handling module comprises supplying reference data in standard forms to the user after establishment of communication with the agency database, and wherein said document routing module comprises routing to said interface module for storage in the enterprise databases, form data, a form reference and an agency reference upon completion of one of the standard forms by the user.

17. A computer program as recited in claim 16, wherein the agency database is one of a plurality of agency databases and the form data stored in the enterprise databases are used to format the reference data from any of the plurality of agency databases, and wherein said document handling module further comprises formatting the reference data, obtained from the agency database based on the form reference and the agency reference, and the form data obtained from the enterprise databases based on the form reference.

18. A computer program as recited in claim 17, wherein the form data define a purchase request form, and wherein said document handling module formats the form data and the reference data to display information relating to at least one of cost, funding, vendor and requestor to the user in an enterprise standard format.

19. A data processing system, comprising:

an enterprise database server to store user data, agency profiles and form data;

a plurality of agency database servers to store agency databases including reference data; and an enterprise system, coupled to said at least one enterprise database server and said agency database servers, to supply information from the agency profiles to users for selection among the agency databases and to route documents to the users based on the user data, each document combining selected form data from said enterprise database server and selected reference data from one of the plurality of agency databases.

20. A data processing system as recited in claim 19, wherein said enterprise database server stores personal queues of the users, each personal queue identified by a user reference identifying a receiving user selected to receive at least one of the documents, and wherein said enterprise system includes a Web server, coupled to said agency database servers via a public computer network, and routes form summary data and a form reference from a sending user to the personal queue of at least one receiving user identified by at least one user reference.

21. A data processing system as recited in claim 20, wherein said data processing system further comprises remote computers, coupled to said Web server via the public computer network, to display the documents output by said Web server, wherein said enterprise database server stores a routing template identifying specified users to receive a specified document type and an order in which the specified users receive a document, and wherein said enterprise system automatically routes the form summary data and the form reference to the personal queues of the specified users based on the routing template when a completed form of the specified document type is stored by a submitting user.

* * * * *

UNITED STATES PATENT AND TRADEMARK OFFICE
CERTIFICATE OF CORRECTION

PATENT NO. : 6,295,536 B1
DATED : September 25, 2001
INVENTOR(S) : James C. Sanne Page 1 of 1

It is certified that error appears in the above-identified patent and that said Letters Patent is hereby corrected as shown below:

Column 1,
Line 55, change "to-design" to -- to design --.

Column 2,
Line 53, change "a thereof" to -- a part hereof --.

Column 4,
Line 6, change "ailing" to -- mailing --;
Line 51, change "User s" to -- Users --;
Line 52, delete "age";
Line 55, change "selecter" to -- selected --.

Column 6,
Line 4, change "wag" to -- was --.

Column 8,
Line 15, change "2l" to -- 2I --.

Column 9,
Line 8, change "2l" to -- 2I --.

Signed and Sealed this

Twenty-sixth Day of March, 2002

*Attest:*

JAMES E. ROGAN
*Attesting Officer*  *Director of the United States Patent and Trademark Office*